United States Patent
Wefers (10) Patent No.: US 9,155,133 B2
(45) Date of Patent: Oct. 6, 2015

(54) MVD METHOD AND DEVICE FOR DRYING AND BUFFERING ORGANIC MOIST PRODUCTS

(75) Inventor: Michael Wefers, Munich (DE)

(73) Assignee: Weco Beratungs—und Beteiligungs GmbH, Aschheim (DE)

(*) Notice: Subject to any disclaimer, the term of this patent is extended or adjusted under 35 U.S.C. 154(b) by 857 days.

(21) Appl. No.: 13/378,777

(22) PCT Filed: Jun. 18, 2010

(86) PCT No.: PCT/EP2010/003685
§ 371 (c)(1),
(2), (4) Date: Dec. 16, 2011

(87) PCT Pub. No.: WO2010/145835
PCT Pub. Date: Dec. 23, 2010

(65) Prior Publication Data
US 2012/0090193 A1    Apr. 19, 2012

(30) Foreign Application Priority Data
Jun. 18, 2009    (DE) .......................... 10 2009 025 472

(51) Int. Cl.
*F26B 7/00* (2006.01)
*H05B 6/80* (2006.01)
(Continued)

(52) U.S. Cl.
CPC ... *H05B 6/80* (2013.01); *A23L 3/01* (2013.01); *A23L 3/0155* (2013.01); *A23L 3/54* (2013.01); *F26B 5/048* (2013.01); *F26B 3/34* (2013.01); *F26B 3/347* (2013.01)

(58) Field of Classification Search
CPC .............. F26B 3/347; F26B 5/048; F26B 3/34
USPC .................................... 34/259, 263, 266, 418
See application file for complete search history.

(56) References Cited

U.S. PATENT DOCUMENTS 3,682,651 A    8/1972    McAlister
4,640,020 A *  2/1987    Wear et al. ....................... 34/263
(Continued)

FOREIGN PATENT DOCUMENTS

DE    4036112 A1    5/1992
DE    19710741 A1    10/1997
(Continued)

OTHER PUBLICATIONS

International Search Report for PCT/EP2010/003685, English Translation attached to original, Both completed by the European Patent Office on Sep. 28, 2010, All together 6 Pages.
(Continued)

*Primary Examiner* — Kenneth Rinehart
*Assistant Examiner* — Gajanan M Prabhu
(74) *Attorney, Agent, or Firm* — Brooks Kushman P.C.

(57) ABSTRACT

A method of drying and buffering organic moist products, particularly food items. Introducing the product into a first chamber, bringing the first chamber to a first reduced ambient pressure, feeding microwave energy from a microwave source so as to increase the temperature and buffer the moist product, and increasing the reduced ambient pressure to a less reduced second ambient pressure multiple times and subsequently reducing the ambient pressure to the first reduced ambient pressure. Wherein the increase of the ambient pressure is carried out faster than the reduction thereof, followed by a final drying of the product in a second chamber while feeding infrared radiation at a third (reduced) ambient pressure. Subsequently, the product is cooled and discharged into the atmosphere. Thus, increased product quality, in particular a more consistent and more stable product is obtained.

17 Claims, 5 Drawing Sheets

(51) Int. Cl.
    *A23L 3/01*    (2006.01)
    *A23L 3/015*   (2006.01)
    *A23L 3/54*    (2006.01)
    *F26B 5/04*    (2006.01)
    *F26B 3/34*    (2006.01)
    *F26B 3/347*   (2006.01)

(56) References Cited

U.S. PATENT DOCUMENTS

| | | | |
|---|---|---|---|
| 5,135,122 A | | 8/1992 | Gross et al. |
| 5,859,412 A | | 1/1999 | Yagi |
| 5,980,962 A | | 11/1999 | Bracken et al. |
| 6,025,580 A | * | 2/2000 | Yagi ........................ 219/685 |
| 6,092,301 A | * | 7/2000 | Komanowsky ............ 34/263 |
| 6,105,278 A | * | 8/2000 | Gerrish et al. ............ 34/497 |
| 6,297,479 B1 | * | 10/2001 | Wefers ...................... 219/388 |
| 6,559,429 B2 | * | 5/2003 | Yagi et al. ................. 219/703 |
| 7,001,629 B1 | * | 2/2006 | Mengal et al. ............. 426/241 |
| 2008/0063675 A1 | * | 3/2008 | Yagi ........................ 424/401 |

FOREIGN PATENT DOCUMENTS

| | | |
|---|---|---|
| DE | 19804386 C2 | 12/1999 |
| DE | 19643989 C2 | 6/2003 |
| JP | 07255388 A | 10/1995 |
| WO | 9736502 A1 | 10/1997 |
| WO | 2009049409 A1 | 4/2009 |

OTHER PUBLICATIONS

Drouzas et al. "Microwave/Vacuum drying of model fruit gels", Journal of Food Engineering (1999), vol. 39, pp. 117-122.

* cited by examiner

MVD METHOD AND DEVICE FOR DRYING AND BUFFERING ORGANIC MOIST PRODUCTS

CROSS-REFERENCE TO RELATED APPLICATION

This application is the U.S. national phase of PCT Appln. No. PCT/EP2010/003685 filed Jun. 18, 2010 which claims priority to German application DE 10 2009 025 472.2 filed Jun. 18, 2009, the disclosures of which are incorporated in their entirety by reference herein.

The invention relates to a method and a device for drying and puffing organic water-moist products.

Dried foodstuff, more particularly fruit and vegetables, are used in many forms and in ever increasing amounts in the food industry.

High quality freeze-dried products are already commercially available but these are fairly expensive. Although conventionally dried products are more cost-effective they are of lower quality.

"MVD (microwave vacuum dried) products" have been under discussion for a number of years; these have completely new qualities, for example in respect of color or in respect of the "feeling in the mouth", in addition to preserving taste and nutrients very well. As a result of the problems in implementing these on an industrial scale and also of the costs connected thereto, such products have until now not managed to become established commercially.

WO 97/36502 has disclosed a method in which not pre-dried but fresh potato chips (80 to 90% water) are agglutinated, dried and puffed. Agglutination is an essential part of the known methods because otherwise puffing cannot take place. In order to achieve the puffing effect, the products are heated to 80° C. at atmospheric pressure. The ambient pressure is then lowered as quickly as possible such that the increase in the internal vapor pressure leads to puffing up or to chips. Carrying out the method on an industrial scale has remained problematic up until now.

U.S. Pat. No. 3,682,651 has disclosed a method, in which cereals are firstly moistened and then puffed and dried, with microwave sources being utilized. Although the document also discusses the option of working at reduced pressure, all that matters here is that the internal pressure in the grains of cereal is greater than the external pressure.

Further methods for microwave drying/puffing in a vacuum have for example been disclosed in DE 196 43 989 and DE 19 80 43 86. However, the final drying of the puffed products at an unmodified negative pressure by means of microwaves and/or infrared was found to be very problematic here because browning effects may occur or the products may even be burnt. Thus, practice these days sees the not yet completely dried products being discharged from the vacuum and the drying being completed in conventional dryers. The products produced thus are expensive, do not meet the desired very high demands in terms of quality and have until now not been commercially successful.

The invention is based on the object of disclosing a method and a corresponding device that afford the possibility of achieving a significantly improved product quality in a cost-effective fashion.

This object is achieved by a method according to claim 1 and a device according to claim 6.

In particular, the object is achieved by a device for drying and puffing organic, water-moist products, comprising the steps of:

a) introducing the water-moist product into a first chamber;
b) evacuating the first chamber to a first reduced ambient pressure and supplying microwave energy from a microwave source in order to increase the temperature and puff the water-moist product and pump away emerging vapors;
c) repeatedly increasing the reduced ambient pressure to a less-reduced second ambient pressure and thereupon reducing the ambient pressure to the first reduced ambient pressure, with the increase in the ambient pressure being carried out faster than the reduction therein;
d) final drying of the product in a second chamber while supplying infrared radiation and at a third ambient pressure and
e) cooling and discharging the product into the atmosphere while increasing the ambient pressure to atmospheric pressure.

An essential part of the invention lies in the fact that the puffing and a first drying take place at a reduced pressure and as a result of supplying microwave energy. By contrast, the final drying is brought about as a result of supplying infrared radiation; to be precise this also takes place at negative pressure, which prevents the product from being burnt. Moreover, the reduced pressure is relieved repeatedly in the first chamber or the product is exposed to slightly higher pressure, with the reduction in pressure being slower than the increase in pressure. This procedure achieves an increased stability of the product, more precisely at a level that was not seen previously.

Microwave energy is preferably not supplied while the ambient pressure is raised, as described above, but merely during the reduction in the pressure and during a phase of constant (low) ambient pressure following this "alternating treatment". This yields an optimum puffing result.

Supplying an inert gas, more particularly supplying nitrogen, preferably causes this increase in the ambient pressure in all phases during which the ambient pressure is increased. This substantially drives out the oxygen still contained in the product or replaces it with nitrogen, which significantly increases the shelf life of the product.

The pressure in the second chamber, in which the final drying of the product is carried out by supplying infrared radiation, is preferably kept substantially constant until discharge. This yields optimum drying results.

The thermal energy is preferably supplied such that the temperature of the product is set dependent on the ambient pressure. This can save energy. This holds true in particular when the temperature of the product is only set slightly above a vaporization point of water arising at the ambient pressure.

Microwave energy is not yet supplied to the first chamber during an initial phase, within which the ambient pressure falls from atmospheric pressure to 700-500 mbar. This improves the puffing result.

The microwave energy is preferably supplied with an extremely high power density, with values between 20 and 50 kWh/m³ and more particularly a value around 30 kWh/m³ proving to be advantageous.

The third ambient pressure, i.e. the pressure set during the final drying of the product by infrared energy, is preferably lower than the first ambient pressure. This brings about an optimum drying result as a result of increasing the water vapor pressure gradient.

The radiation energy supply is preferably time controlled fashion dependent on the temperature of the product, ensuring not only optimum product sparing and nutrient preservation, but also minimized energy usage.

In order to ensure heating of the product (by puffing and drying) using microwave energy, which heating is as uniform as possible, the product is moved within the electric field of the microwave energy. This continuous movement is preferably brought about in the form of a rotation and a raising and lowering of the microwave source with respect to the product, or vice versa, wherein the amplitude of this movement should be of the order of half a wavelength of the microwave radiation such that the product or parts of the product can never lie continuously in the vicinity of a field strength maximum or field strength minimum during the irradiation process. This ensures a more uniform heating (drying and puffing) of the product and at the same time allows operation at an increased radiation intensity.

The aforementioned object is achieved by a device comprising:
a) a first chamber with an access opening for introducing a product carrier into the first chamber;
b) a second chamber with apparatuses for moving the product from the first chamber into the second chamber and with apparatuses for discharging the product;
c) at least one microwave source, which is arranged in the first chamber such that, in the first chamber, microwave energy can be supplied to the product for increasing the temperature and for puffing the water-moist product;
d) at least one infrared source, which is arranged in the second chamber such that, in the second chamber, infrared energy can be supplied to the product for increasing the temperature and for drying the product;
e) at least one vacuum pump, which is connected to the first chamber and the second chamber such that an ambient pressure in the first chamber and an ambient pressure in the second chamber can be reduced;
f) a control apparatus, which is connected to the vacuum pump such that the ambient pressure in the first chamber can be reduced or increased to a first reduced ambient pressure and, repeatedly, to a less-reduced second ambient pressure, with the increase in the ambient pressure being carried out faster than the reduction therein.

Thus, an essential part of the device lies in the fact that alternating raising and lowering of the ambient pressure can be brought about within the vacuum, as a result of which the surface of the product stabilizes.

In the first chamber in particular (optionally in the second chamber as well), provision is made for heating apparatuses on internal walls of the chamber such that there cannot be condensation of the water that was removed from the product. This can achieve improved drying at a lower heater power or microwave power.

In order to supply the product to the method in the first chamber, provision is made for a receptacle device that holds a product carrier on which the product is located. This receptacle device is provided with a movement apparatus such that the product carrier can be moved cyclically in all three spatial directions with respect to the microwave source during the drying and puffing process. The movement amplitude preferably corresponds to at least half a wavelength of the applied microwave radiation. By way of example, in the case of conventional microwave sources with 2450 MHz, the lift is approximately 60 mm.

The receptacle device is preferably metallic, more particularly embodied as a circular stainless steel plate with a lateral raised edge. This lateral raised edge brings about reduced focusing of microwave radiation at the edge of the plate.

Provision is preferably made for a microwave-neutral spacer plate which keeps the product carrier distanced from the metallic receptacle device by approximately half a wavelength. This allows improved power transmission of the microwave energy.

Provision is preferably made for an inert gas source, more particularly a nitrogen source, which can be controlled such that inert gas is supplied for increasing the pressure during each increase in the pressure in the first chamber and/or in the second chamber. As a result, it is possible to achieve a very rapid increase in pressure. Moreover, this makes it possible for the oxygen initially present in the product to be replaced by the inert gas, which significantly increases the shelf life of the product.

Provision is preferably made in the second treatment chamber, where the final drying of the product takes place, for an inert gas rinsing apparatus, which is arranged such that exhaust vapors, i.e. the vapor emerging from the product, can be discharged in the counter flow to a product transport.

Preferred embodiments of the invention emerge from the dependent claims and the following description of exemplary embodiments, in which:

Figure 1:
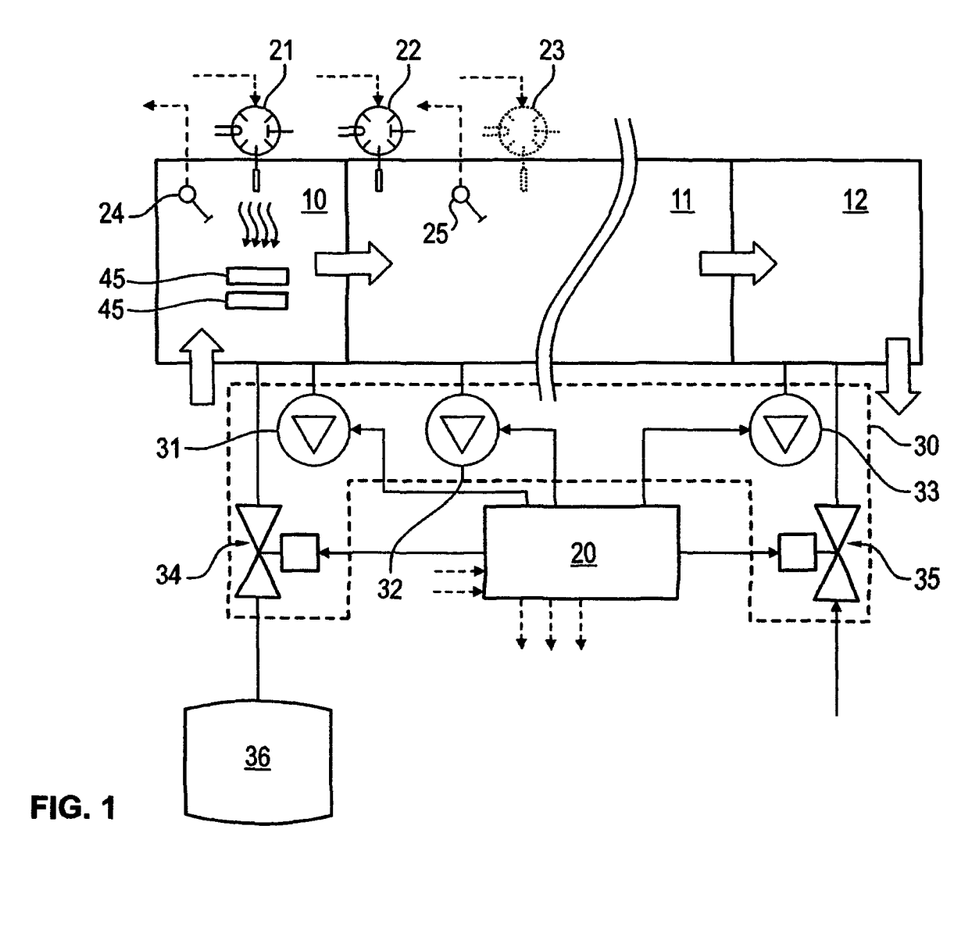
FIG. 1 shows a schematic block diagram of a first embodiment of the device according to the invention.

In the exemplary embodiment of the device according to the invention shown in FIG. 1, provision is made for a first chamber 10, which is provided with an airlock (not illustrated) for moving a treated product into a subsequent second chamber 11. Provision is made for a third chamber 12 following this (with an interposed airlock not illustrated here). The product is finally discharged into the atmosphere from the third chamber 12. The three chambers can be separated from one another in an airtight fashion.

Provision is made for a first heat source 21, namely a microwave source, in the first chamber; said heat source is more particularly illustrated as a magnetron in the block diagram. This allows a water-moist product, located in the chamber 10, to be heated by microwaves.

The second chamber 11 is larger than the first chamber 10 and accordingly also has more heat sources 22, 23, which are at least in part embodied as infrared sources. The product puffed in the first chamber is dried in the second chamber 11 until it reaches a final moisture at which the product can then be sold commercially. The embodiment shown in the exemplary embodiment as per FIG. 1 is provided with a third chamber 12, which serves as an exit airlock.

Furthermore, provision is made for first and second temperature sensors 24, 25 in the first and in the second chamber 10 and 11. The temperature sensors 24, are designed to sample the temperature of the respectively treated product. This is preferably brought about by a contactless measurement.

Provision is made for a pressure regulation apparatus 30 for setting the pressure in the chambers 10 to 12. This pressure regulation apparatus 30 comprises vacuum pumps 31 to 33, by means of which the interiors of the chambers 10 to 12 can be evacuated.

Furthermore, provision is made for an inert gas source 36, more particularly a nitrogen tank, which is connected to the first chamber 10 via a valve 34. The third chamber 12 is connected to the atmosphere via a valve 35. The valves, the pumps and the energy sources (microwave sources, infrared radiation sources) and the sensors 24, 25 are connected to a control or a computer 20. This firstly allows the temperatures of the products to be determined and secondly allows the heat sources 21 to 23, the vacuum pumps 31 to 33 and the valves 34 and 35 to be set. The pressure sensors likewise present are not illustrated in the drawings for reasons of clarity. However, the computer 20 can in any case monitor the internal pressure in the chambers 10 to 12.

Figure 2:
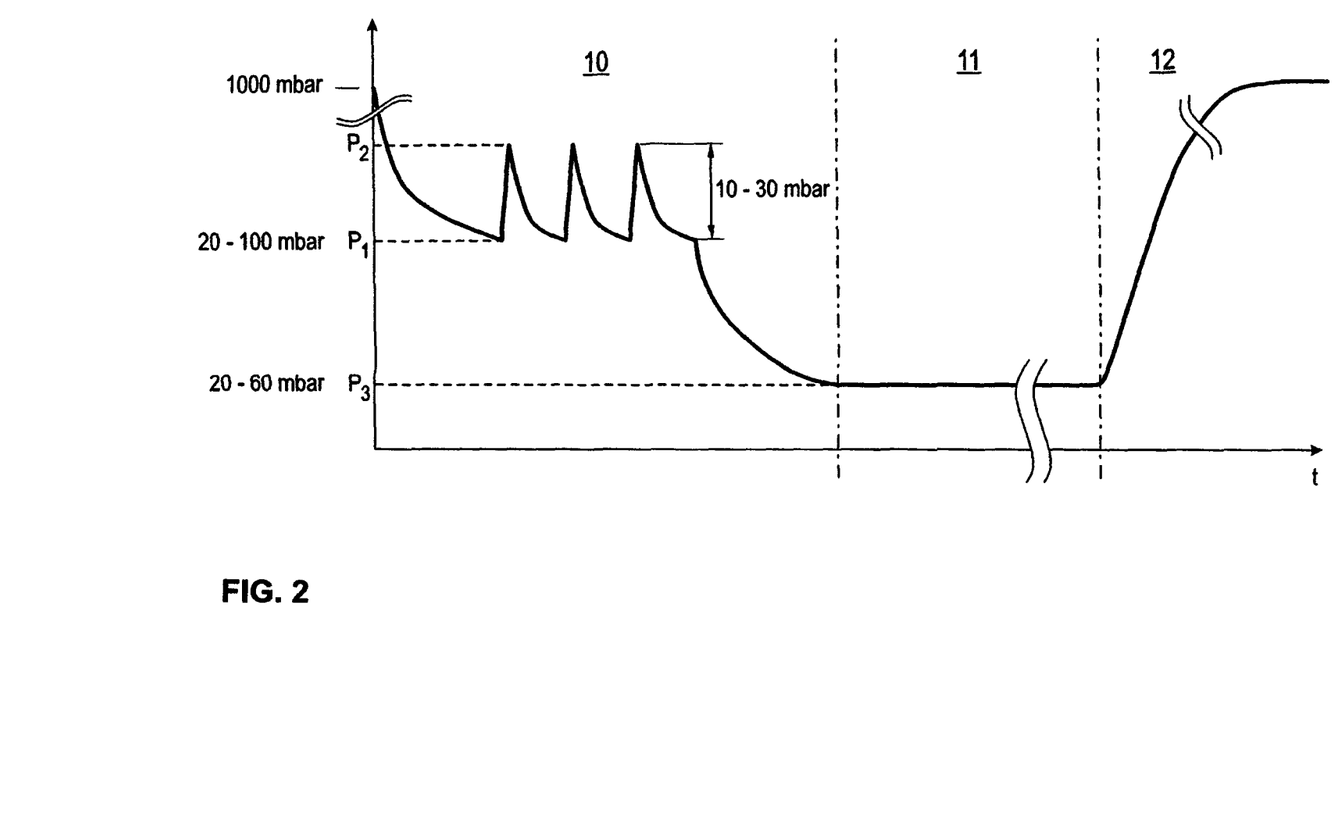
FIG. 2 shows a pressure/time diagram of a treatment process.

The functionality of the device embodied thus is explained in more detail in the following text on the basis of FIG. 2, in which the pressure in the chambers is plotted over time.

At first, a certain amount of the product to be dried and to be treated is introduced into the first chamber and the latter is sealed in a pressure-tight fashion. Then the first vacuum pump 31 is used to reduce the pressure within the first chamber 10 to a reduced ambient pressure $P_1$, as shown in FIG. 2. The microwave source 21 is switched on after the pressure has been reduced by a certain amount (this is explained in more detail in the embodiment described next).

When the first reduced pressure $P_1$ is reached, the computer 20 opens the valve 34 such that inert gas flows into the chamber 10 from the container 36 and the pressure as a result rises very quickly to a second reduced pressure $P_2$. Then the valve 34 is closed again and the vacuum pump 31 once again pumps gas out of the chamber 10 such that the pressure falls again (more slowly). This process of reducing and (abruptly) increasing the internal pressure within the chamber 10 is repeated a number of times. During this time, the computer 20 also regulates the heat source 21 such that the product situated in the chamber 10 or the water content in these water-moist products is heated and evaporated. Here the temperature of the water-moist product is established by the first temperature sensor 24. The computer 20 regulates the heat source 21 such that when the temperature of the product reaches a value that lies not too far above the boiling point said heat source is switched off or the power thereof is reduced. This temperature, i.e. the vaporization point of water, is dependent on the pressure prevailing in the treatment chamber 10. After the pressure within the chamber 10 is reported to the computer 20 by the pressure sensor (not shown), the computer 20 can calculate this boiling point or read it out from a table. This process of reducing pressure, while at the same time supplying energy, and increasing the pressure, while at the same time switching off the microwave energy, is continued for a predetermined period of time. Then the pressure in the interior of the chamber 10 is reduced to a value $P_3$, which corresponds to the pressure within the subsequent second chamber 11. The amount of product contained in the chamber 10 is moved into the second chamber 11 as soon as this pressure is reached. Then the connecting door between the first chamber 10 and the second chamber 11 (or a corresponding airlock) is once again closed in a pressure-tight fashion, whereupon the above described introduction process, i.e. the transfer of water-moist product into the first chamber 10, can once again start anew.

The product contained in the second chamber 11 is now transported in this chamber 11 in the direction toward the third chamber 12. At the same time, gas is suctioned out of the second chamber 11 via the vacuum pump 32. This gas is substantially water vapor produced by the energy supply from the heat sources 22, 23. Reference is made to the fact that these heat sources 22, 23 are represented as magnetrons in the exemplary embodiment shown in FIG. 1. Preferably, provision is additionally, or else alternatively, made for infrared sources. Here the computer 20 once again also operates such that the temperature of the product is not unnecessarily far above the vaporization point of water. Thus the product cannot be burnt. In order to discharge exhaust gasses more rapidly, a pulsating protective gas flow is routed counter to the flow of the transport direction (see arrow direction) of the product carrier and also suctioned away by the vacuum pump 32. This can reduce the dwell time of the product in the chamber 11 and increase the drying speed.

The connecting door between the chambers 11 and 12 is opened after the drying process is completed. The pressure in the interior of the chamber 12 was previously, in this step, reduced to the aforementioned pressure $P_3$ by the computer 20 such that the pressure level was matched to the pressure in the preceding second chamber 11. The amount of product contained in the chamber 11 is now transferred into the third chamber 12. The connecting door between the second chamber 11 and the third chamber 12 is once again sealed after this in a pressure-tight fashion.

The internal pressure of the third chamber 12 is now increased to atmospheric pressure as a result of slow, computer-controlled opening of the valve 35, and so the product can be discharged via an appropriate discharge flap or discharge airlock.

In the following text, a further embodiment of the invention is described in more detail on the basis of FIG. 3.

Figure 3:
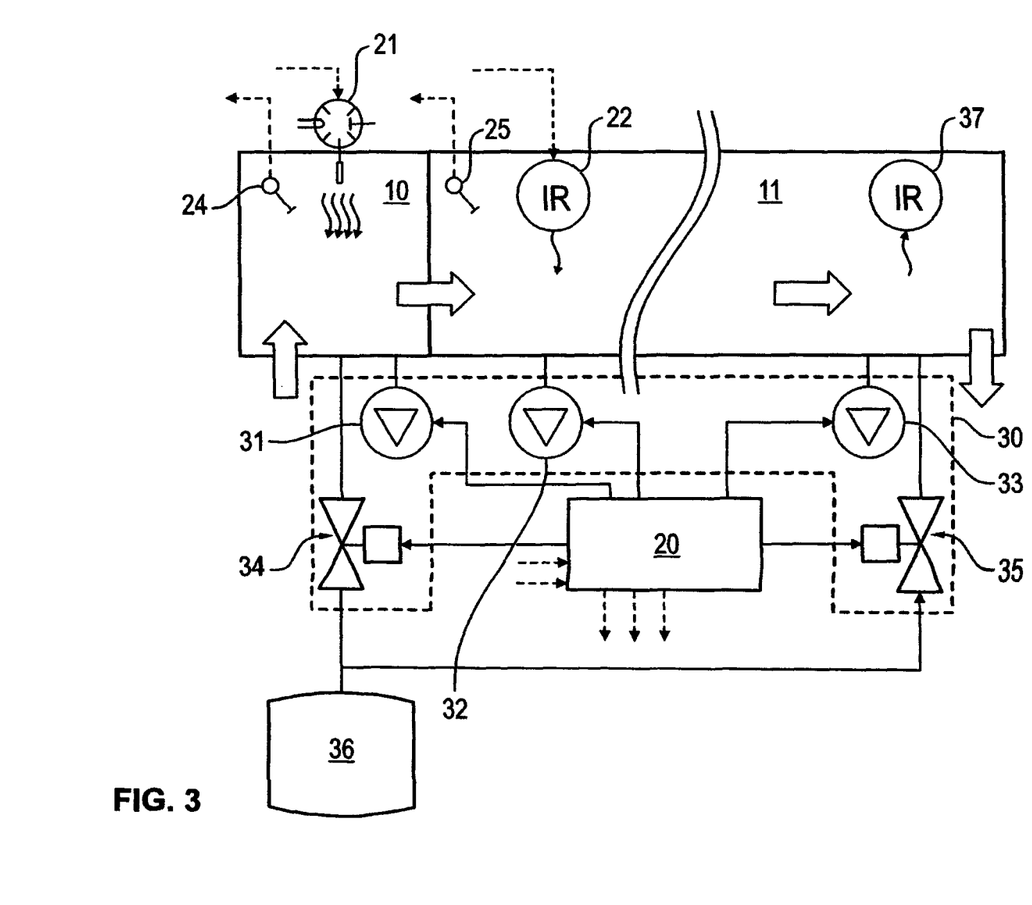
FIG. 3 shows a schematic block diagram of a second embodiment of the device according to the invention.

The embodiment according to FIG. 3 differs from the one according to FIG. 1 in a number of ways.

First of all, provision is merely made for two chambers in this embodiment of the invention, namely the first chamber 10 and the second chamber 11. The above-described first drying and puffing of the product takes place in the first chamber 10, with the walls of the chamber 10 being provided with heating elements on their interior surfaces such that these walls can be kept at a temperature at which there is no condensation of the water that was removed from the product.

As a heat source 22, the second chamber 11 has a multiplicity of infrared emitters or similar devices for supplying thermal energy to the product situated in the chamber 11. Furthermore, provision is made for an infrared sink 37 for removing heat from the product after completing the drying process or for re-cooling it.

Moreover, the valve 35 is on the one hand connected to the chamber 11 and on the other hand connected to the inert gas source 36 in this embodiment of the invention, with the control 20 being embodied such that every pressure rise in the chambers 10 or 11 is brought about by the addition of inert gas from the inert gas source 36.

Figure 4:
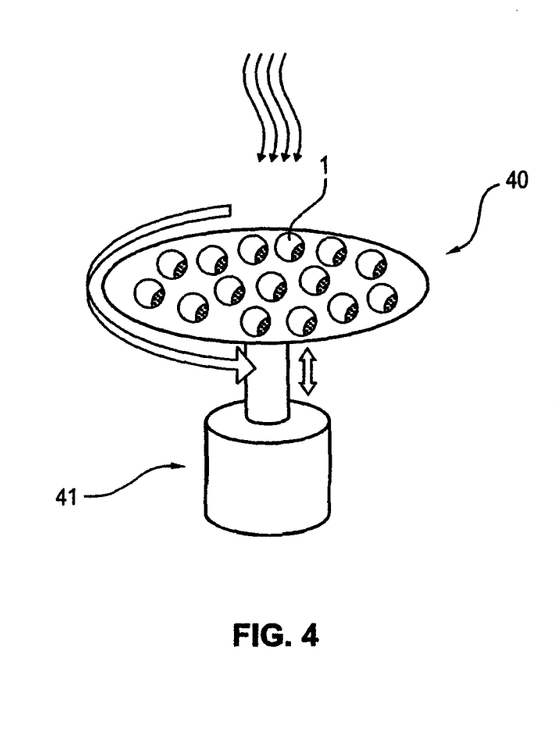
FIG. 4 shows a perspective illustration of the principle of a receptacle device with a product situated thereon.
Figure 5:
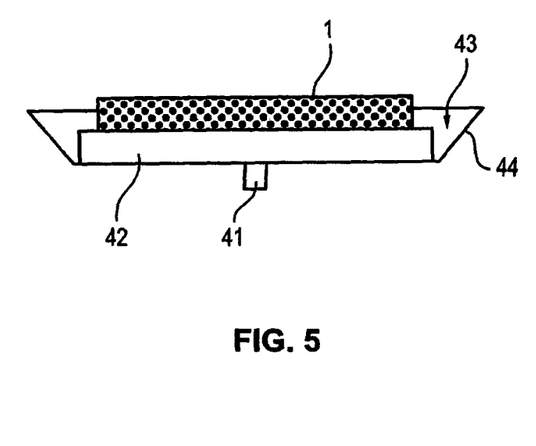
FIG. 5 shows a schematic sectional illustration through a receptacle plate with spacer and product receptacle device and FIG. 6 shows a pressure/temperature/time diagram of a special embodiment of a treatment process.

As illustrated schematically in FIGS. 4 and 5, the product 1 is situated on a receptacle device 40 when it is irradiated by microwave radiation from the first heat source 21 (magnetron) in the first chamber 10. The receptacle device 40 comprises a movement apparatus 41, which moves the product with respect to the microwave source 21 in both a horizontal direction (e.g. by rotation) and a vertical direction. This relative movement is set such that the product 1 is continuously moved by approximately half a wavelength with respect to the microwave source 21. This ensures particularly uniform heating of the product.

It emerges from FIG. 5 that the receptacle device 40 comprises a plate 43, the edge of which has a raised edge 44. On the plate 43, which is preferably made of stainless steel, there is a spacer plate 42 made of microwave-permeable material on which, in turn, the product 1 is situated in e.g. a bowl (likewise made of microwave-permeable material). The thickness of the spacer plate 42 is once again half a wavelength. The raised edge 44 and the spacer plate 42 prevent the product 1 from being heated non-uniformly and possibly being burnt as a result of standing waves or otherwise increased radiation densities.

Figure 6:
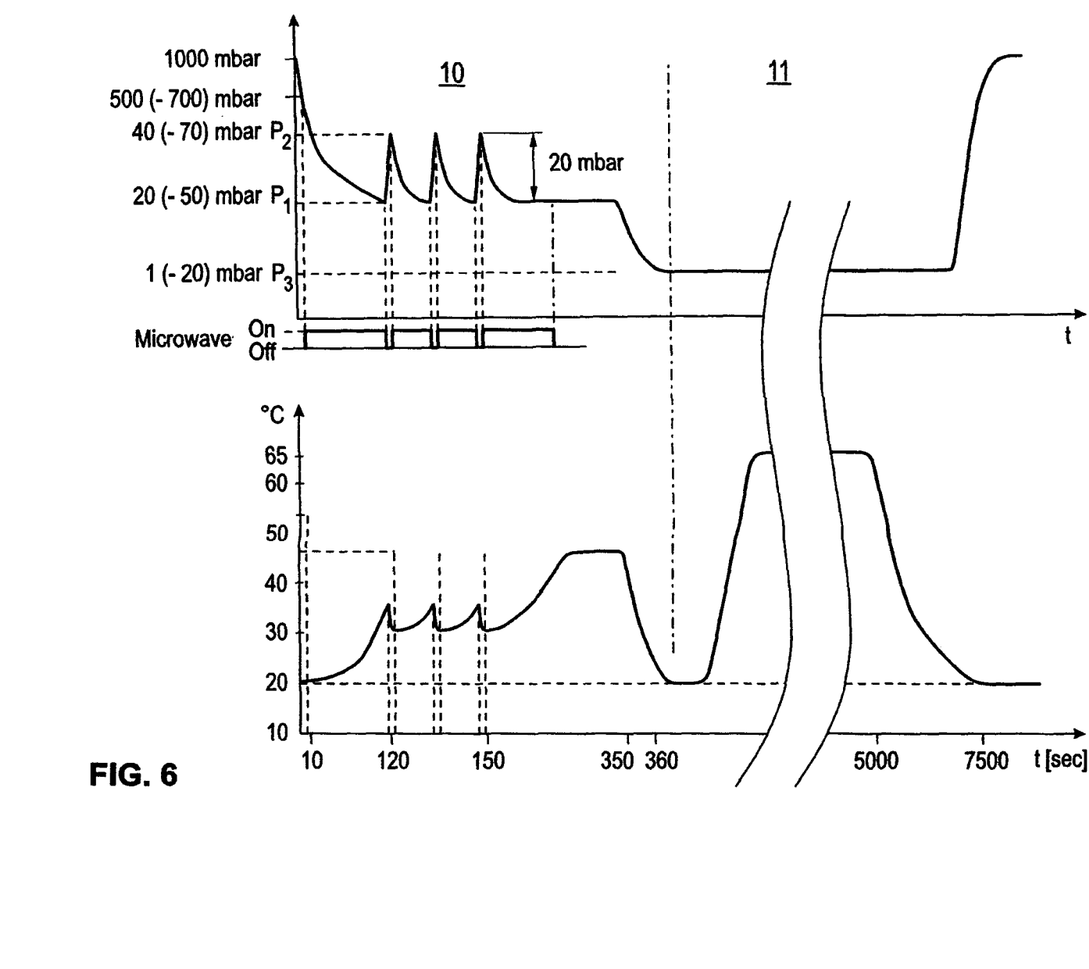

In the following text, a particularly preferred embodiment of the method is described in more detail on the basis of FIG. 6. Reference is made to the fact here that the pressure, temperature and time values and value ranges specified in the drawings are claimed as essential to the invention.

After introducing the product into the first chamber 10 the pressure therein is lowered. The pressure has been lowered to 500 to 700 mbar after approximately 10 seconds. The microwave source 21 is switched on at this point in time. Accordingly, the temperature of the still water-moist product rises to approximately 35° C. When the first reduced pressure $P_1$, which lies at approximately 20 to 50 mbar, is reached the microwave source is on the one hand switched off and on the other hand the valve 34 is opened such that inert gas from the inert gas source 36 flows into the first chamber 10 and the pressure in this first chamber 10 rises to 40 to 70 mbar. This process takes place at approximately 120 seconds after the start of the treatment in the first chamber 10. Here the temperature falls to approximately 30° C.

After the pressure increase, which occurs very rapidly, is complete, the valve 34 is closed and the vacuum pump 31 is once again put into operation. The pressure once again falls to the first reduced ambient pressure $P_1$ (20 to 50 mbar). The microwave source 21 is once again switched on during this period of time, and so the temperature of the product once again rises to approximately 35° C. In the exemplary embodiment shown here, this process is repeated three times. The speed of the pressure increase is in each case two to three times as fast as the speed of the pressure decrease.

After the third such pressure changing process (approximately 150 seconds after the start of the treatment in the first chamber 10), the pressure in the first chamber is kept constant at the lower, first ambient pressure (20 to 50 mbar) until approximately 350 seconds after the start of the treatment in the first chamber. Thereupon the pressure is reduced further, to be precise to a third ambient pressure lying at approximately 1 to 20 mbar. The product is moved into the second chamber 11 at this very low pressure. Infrared energy is now supplied within the second chamber 11, and so the product is heated to approximately 65° C. The product is kept at this temperature and at this pressure until approximately 5000 seconds after the start of the treatment. During this time there is a final drying of the product. Now the supply of infrared energy by the source 22 is switched off, and the cooling of the product commences until (approximately 7500 seconds after the start of the treatment) the product has reached an ambient temperature of approximately 20° C. At this time the vacuum pumps 32 and 33 are switched off and the valve is opened such that inert gas from the inert gas source 36 flows into the second chamber 11 and the pressure therein rises to atmospheric pressure. Once the atmospheric pressure has been reached, the second chamber 11 is opened and the product is removed from the second chamber 11. Thereupon the product can be packaged in an airtight fashion and readied for distribution.

It emerges from the description above that various method steps and device parts, more particularly the method steps and device parts described in the introduction, can be combined as desired. Particularly in the case of the pressure and temperature specifications, and also in the case of time specifications, variations are possible, even though preferred embodiments were explained here.

LIST OF REFERENCE SIGNS

1 Product
10 First chamber
11 Second chamber
12 Third chamber
20 Computer
21 First heat source
22 Second heat source
23 Third heat source
24 First temperature sensor
25 Second temperature sensor
30 Pressure control apparatus
31 First vacuum pump
32 Second vacuum pump
33 Third vacuum pump
34 First valve
35 Second valve
36 Inert gas source
37 Infrared sink/cooling apparatus
40 Receptacle device
41 Movement apparatus
42 Spacer plate
43 Plate
44 Raised edge
45 Heating apparatus

The invention claimed is:

1. A method for drying and puffing organic, water-moist products, comprising the steps of:
   a) introducing the water-moist product into a first chamber;
   b) evacuating the first chamber to a first reduced ambient pressure ($P_1$) and supplying microwave energy from a microwave source in order to increase the temperature and puff the water-moist product and pump away emerging vapors;
   c) repeatedly increasing the reduced ambient pressure ($P_1$) to a less-reduced second ambient pressure ($P_2$) and thereupon reducing the ambient pressure to the first reduced ambient pressure (P1), with the increase in the ambient pressure ($P_1$ to $P_2$) being carried out faster than the reduction therein;
   d) final drying of the product in a second chamber while supplying infrared radiation and at a third ambient pressure ($P_3$) being lower than the first reduced ambient pressure ($P_1$), and
   e) cooling and discharging the product into the atmosphere while increasing the ambient pressure to atmospheric pressure.

2. The method of claim 1, wherein,
   in steps c and/or e, the ambient pressure is increased by supplying an inert gas, the pressure increase ($P_1$ to $P_2$) takes substantially half the time of the reduction ($P_2$ to $P_1$), or both.

3. The method of claim 2, wherein the inert gas is nitrogen.

4. The method of claim 1, wherein,
   in steps d and/or e, the third ambient pressure ($P_3$) in the second chamber is kept substantially constant until the discharge takes place.

5. The method of claim 1, wherein
   the thermal energy is supplied such that the temperature of the product is set dependent on the ambient pressure,
   the temperature of the product is only set slightly above a vaporization point of water arising at the ambient pressure,
   in step b, microwave energy with an extremely high power density of between 20 kWh/m$^3$ to about 50 kWh/m$^3$ is only supplied from an ambient pressure between 500 and 700 mbar, and
   the radiation energy supply is time controlled, dependent on the temperature of the product, or a combination thereof.

6. The method of claim 1, wherein,
in steps b and c, the product is moved with respect to the microwave or the microwave is moved with respect to the product by a distance of at least half a wavelength of the microwave energy.

7. The method of claim 6, wherein the movement is being brought about by rotating, raising, lowering, or a combination thereof, of a product carrier carrying the product.

8. A device for drying and puffing organic water-moist products comprising:
a) a first chamber with an access opening for introducing a product carrier into the first chamber;
b) a second chamber with apparatuses for moving the product from the first chamber into the second chamber and with apparatuses for discharging the product;
c) at least one microwave source, which is arranged in the first chamber such that, in the first chamber, microwave energy can be supplied to the product for increasing the temperature and puffing the water-moist product;
d) at least one infrared source, which is arranged in the second chamber such that, in the second chamber, infrared energy can be supplied to the product for increasing the temperature and for drying the product;
e) at least one vacuum pump, which is connected to the first chamber and the second chamber such that an ambient pressure ($P_1$, $P_2$) in the first chamber and an ambient pressure ($P_3$) in the second chamber can be reduced, wherein the ambient pressure ($P_3$) in the second chamber is lower than the ambient pressure ($P_1$, $P_2$) in the first chamber;
f) a control apparatus, which is connected to the vacuum pump such that the ambient pressure ($P_1$) in the first chamber can be reduced or increased to a first reduced ambient pressure ($P_1$) and, repeatedly, to a less-reduced second ambient pressure ($P_2$), with the increase in the ambient pressure ($P_1$ to $P_2$) being carried out faster than the reduction ($P_2$ and $P_1$) therein.

9. The device of claim 8, wherein
the first chamber has heating apparatuses for heating internal walls of the first chamber such that condensation of water is preventable.

10. The device of claim 8, characterized by a receptacle device for holding a product carrier in the first chamber, wherein the receptacle device is provided with a movement apparatus such that the product carrier can be moved cyclically in all three spatial directions with respect to the microwave source during the drying and puffing process.

11. The device of claim 10, wherein an amplitude of movement corresponds to at least half a wavelength of the microwave energy.

12. The device of claim 8, characterized by a receptacle device for holding a product carrier in the first chamber, wherein the receptacle device is metallic.

13. The device of claim 12, wherein the receptacle device is embodied as a circular stainless steel sheet.

14. The device of claim 8, wherein provision is made for an inert gas source which can be controlled such that inert gas is supplied for increasing the pressure during each increase in the pressure in the first chamber and/or in the second chamber.

15. The device of claim 14, wherein the inert gas is nitrogen.

16. The device of claim 8, characterized by an inert gas rinsing apparatus, which is arranged in the second chamber such that exhaust vapors can be discharged in the counter flow to a product transport.

17. A device for drying and puffing organic water-moist products comprising:
a) a first chamber with an access opening for introducing a product carrier into the first chamber;
b) a second chamber with apparatuses for moving the product from the first chamber into the second chamber and with apparatuses for discharging the product;
c) at least one microwave source, which is arranged in the first chamber such that, in the first chamber, microwave energy can be supplied to the product for increasing the temperature and puffing the water-moist product;
d) at least one infrared source, which is arranged in the second chamber such that, in the second chamber, infrared energy can be supplied to the product for increasing the temperature and for drying the product;
e) at least one vacuum pump, which is connected to the first chamber and the second chamber such that an ambient pressure ($P_1$, $P_2$) in the first chamber and an ambient pressure ($P_3$) in the second chamber can be reduced, wherein the ambient pressure ($P_3$) in the second chamber is lower than the ambient pressure ($P_1$, $P_2$) in the first chamber;
f) a control apparatus, which is connected to the vacuum pump such that the ambient pressure ($P_1$) in the first chamber can be reduced or increased to a first reduced ambient pressure ($P_1$) and, repeatedly, to a less-reduced second ambient pressure ($P_2$), with the increase in the ambient pressure ($P_1$ to $P_2$) being carried out faster than the reduction ($P_2$ and $P_1$) therein;
characterized by a receptacle device for holding a product carrier in the first chamber, wherein the receptacle device is metallic; and
wherein the receptacle device has a microwave-neutral spacer plate with a thickness of an order of half a wavelength of the microwave energy such that the product carrier is distanced from the metallic receptacle device by half a wavelength.

* * * * *